US010572137B2

(12) United States Patent
Rajabi et al.

(10) Patent No.: US 10,572,137 B2
(45) Date of Patent: Feb. 25, 2020

(54) INTUITIVE DOCUMENT NAVIGATION WITH INTERACTIVE CONTENT ELEMENTS

(71) Applicant: Microsoft Technology Licensing, LLC., Redmond, WA (US)

(72) Inventors: Zeyad Rajabi, Issaquah, WA (US); Robert Earl Stout, Bellevue, WA (US); Jennifer Michelstein Halberstam, Kirkland, WA (US); Erez Kikin-Gil, Bellevue, WA (US); David Benjamin Lee, Sammamish, WA (US); Dimitrije Dimic, Nis (RS); Dragan Slaveski, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 341 days.

(21) Appl. No.: 15/222,895

(22) Filed: Jul. 28, 2016

(65) Prior Publication Data

US 2017/0277378 A1 Sep. 28, 2017

Related U.S. Application Data

(60) Provisional application No. 62/314,204, filed on Mar. 28, 2016.

(51) Int. Cl.
*G06F 3/0485* (2013.01)
*G06F 3/0481* (2013.01)
(Continued)

(52) U.S. Cl.
CPC ............ *G06F 3/0485* (2013.01); *G06F 3/048* (2013.01); *G06F 3/0481* (2013.01);
(Continued)

(58) Field of Classification Search
CPC .. G06F 3/0485; G06F 3/04842; G06F 3/0484; G06F 3/0488; G06F 3/048; G06F 3/0481; G06F 17/212; G06F 2203/04804
See application file for complete search history.

(56) References Cited

U.S. PATENT DOCUMENTS 6,831,631 B2 * 12/2004 Chuang ................. G06F 3/0488
178/18.01
7,934,166 B1 * 4/2011 Clark ................... G06F 3/04855
715/784
(Continued)

OTHER PUBLICATIONS

"International Search Report and Written Opinion Issued in PCT Application No. PCT/US2017/023497", dated Jul. 6, 2017, 10 Pages.
(Continued)

*Primary Examiner* — Nicholas Klicos
(74) *Attorney, Agent, or Firm* — Merchant & Gould

(57) ABSTRACT

Improved computer efficiency for document navigation is provided. A transparent overlay is automatically applied to an interactive content element to prevent inadvertent interaction with the element during scrolling operations. In some examples, upon determining a user's intent is to navigate a parent document comprising an embedded interactive element, the overlay is applied, and user-interaction with the interactive element is temporarily disabled. Upon determining the user's intent is to interact with the interactive element, the overlay is removed, and user-interaction with the interactive element is enabled. When the overlay is removed, a contextual hint, such as via a user interface control, can be provided to indicate how to continue navigating the parent document. In other examples, the transparent overlay is customized according to each interactive content element, wherein user controls associated with the
(Continued)

interactive element are exposed, and wherein the overlay is perpetually applied to the interactive element.

18 Claims, 12 Drawing Sheets

(51) Int. Cl.
*G06F 3/0488* (2013.01)
*G06F 3/048* (2013.01)
*G06F 3/0484* (2013.01)
*G06F 17/21* (2006.01)

(52) U.S. Cl.
CPC .......... *G06F 3/0488* (2013.01); *G06F 17/212* (2013.01); *G06F 3/0484* (2013.01); *G06F 3/04842* (2013.01); *G06F 2203/04804* (2013.01)

(56) References Cited

U.S. PATENT DOCUMENTS

| | | | | |
|---|---|---|---|---|
| 8,601,561 B1* | 12/2013 | Cleron | .................... | G06F 21/31 726/7 |
| 2003/0122787 A1* | 7/2003 | Zimmerman | ....... | G06F 3/04883 345/173 |
| 2005/0216856 A1 | 9/2005 | Matti | | |
| 2008/0163090 A1 | 7/2008 | Cortright | | |
| 2008/0235616 A1* | 9/2008 | Neervoort | ............. | G06F 3/0485 715/784 |
| 2011/0047504 A1* | 2/2011 | Wienands | ............. | G06F 3/0485 715/786 |
| 2011/0271185 A1* | 11/2011 | Chen | ........................ | G06F 9/453 715/708 |
| 2013/0009858 A1* | 1/2013 | Lacey | ................... | G06F 1/1643 345/156 |
| 2013/0152012 A1 | 6/2013 | Jarrett et al. | | |
| 2013/0212465 A1 | 8/2013 | Kovatch | | |
| 2014/0059478 A1* | 2/2014 | Dearman | ............ | G06F 3/04886 715/781 |
| 2014/0189579 A1* | 7/2014 | Rimon | .................. | G06F 3/0485 715/784 |
| 2014/0229834 A1* | 8/2014 | Jain | ...................... | G06F 3/0488 715/720 |
| 2014/0258029 A1 | 9/2014 | Thierry et al. | | |
| 2014/0372893 A1 | 12/2014 | Yamat et al. | | |
| 2015/0067596 A1* | 3/2015 | Brown | .................. | G06F 3/0416 715/808 |
| 2015/0195789 A1* | 7/2015 | Yoon | ..................... | G06F 3/0488 345/173 |
| 2015/0227288 A1 | 8/2015 | Foster | | |
| 2015/0362959 A1* | 12/2015 | Popescu | ................ | G06F 3/0488 345/173 |
| 2016/0179324 A1* | 6/2016 | Santos-Gomez | ... | G06F 3/04883 345/173 |
| 2016/0216874 A1* | 7/2016 | Bayston | ................ | G06F 3/0481 |
| 2017/0357374 A1* | 12/2017 | Li | ......................... | G06F 3/0418 |

OTHER PUBLICATIONS

"How to manage scrolling issues of a full-width embedded google map in a webpage?", Published on: Aug. 7, 2015 Available at: http://ux.stackexchange.com/questions/78592/how-to-manage-scrolling-issues-of-a-full-width-embedded-google-map-in-a-webpage.

Burnette, Ryan, "Scrolling Can Be Interrupted by Hovering A Google Map", Published on: Oct. 2, 2014 Available at: http://www.ryanburnette.com/blog/2014/scrolling-can-be-interrupted-by-hovering-a-google-map.html.

Reece, Jon, "Embedded maps with a touch- and mousewheel-friendly interface", Published on: Mar. 3, 2014 Available at: http://codepen.io/jreece/details/szlov/.

"How to properly display an iFrame in mobile safari", Published on: Mar. 28, 2013 Available at: http://stackoverflow.com/questions/5267996/how-to-properly-display-an-iframe-in-mobile-safari/5359546#5359546.

"How to disable mouse scroll-wheel scaling with Google Maps API", Published on: Apr. 15, 2015 Available at: http://stackoverflow.com/questions/2330197/how-to-disable-mouse-scroll-wheel-scaling-with-google-maps-api/2330272#2330272.

Sturlese, Luca, "Disabling zooming in Google Maps iframe", Published on: Sep. 30, 2014 Available at: http://9to5it.com/disabling-zooming-google-maps-iframe/.

"How to disable mouse scroll over markers in Bing Maps v7", Published on: Aug. 2, 2012 Available at: http://stackoverflow.com/questions/10341548/how-to-disable-mouse-scroll-over-markers-in-bing-maps-v7.

"Office Action Issued in European Patent Application No. 17715005.9", dated Aug. 23, 2019, 5 Pages.

* cited by examiner

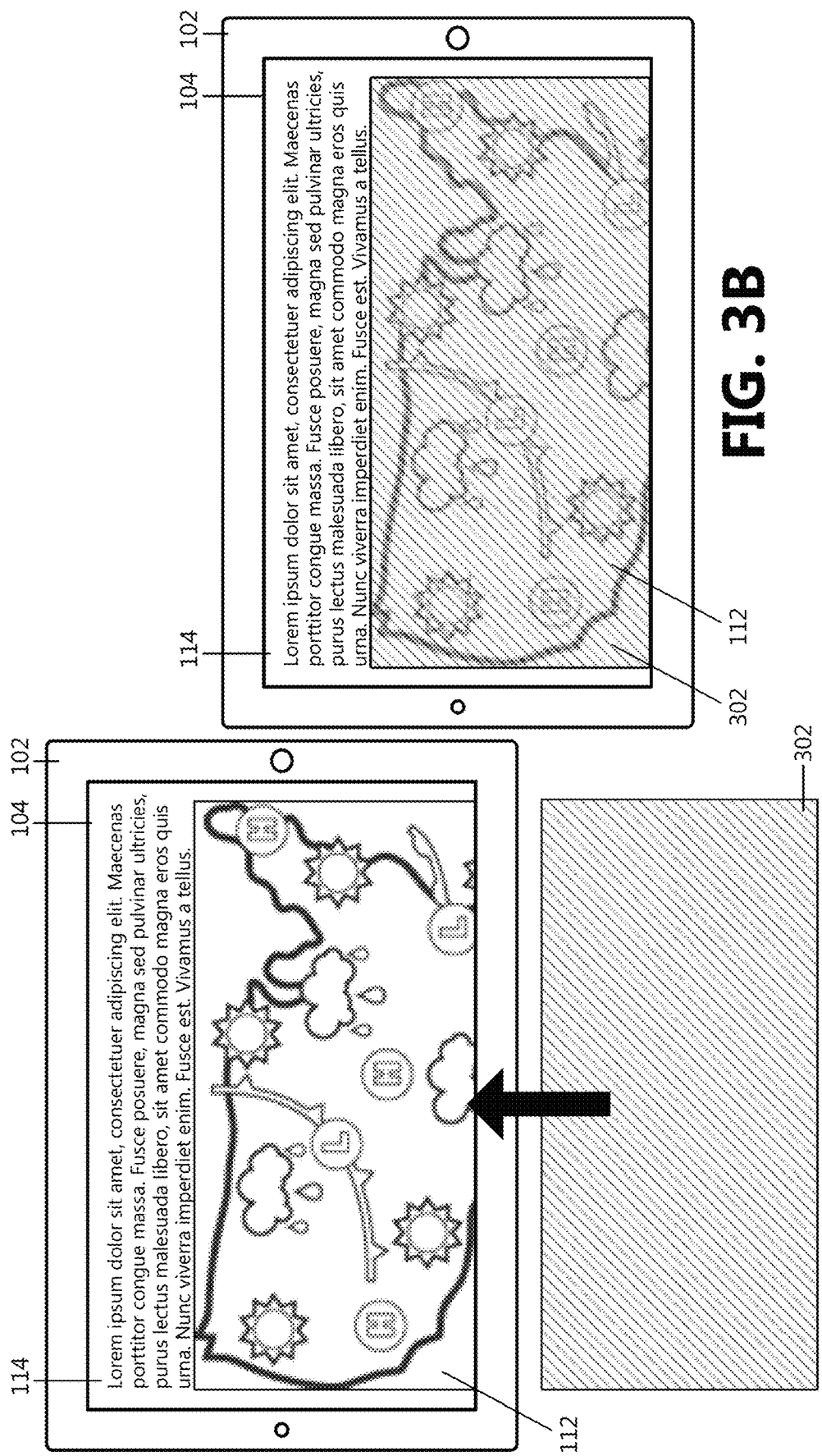

MOBILE COMPUTING DEVICE

INTUITIVE DOCUMENT NAVIGATION WITH INTERACTIVE CONTENT ELEMENTS

CROSS-REFERENCE TO RELATED APPLICATIONS

The application claims priority to U.S. Provisional Patent Application No. 62/314,204 titled "Intuitive Document Navigation with Interactive Content Elements" filed Mar. 28, 2016, the disclosure of which is hereby incorporated by reference in its entirety.

BACKGROUND

Computer and software users have grown accustomed to user-friendly software applications that provide intuitive graphical user interfaces and accurate and efficient user experiences. Many documents, such as productivity application documents, storytelling presentations, webpages, etc., include interactive content elements, such as embedded maps, video clips, charts, web content, etc. Oftentimes, when a user tries to scroll past an interactive content element, the scrolling interaction is inadvertently applied to the interactive content element, rather than to the parent document in which the interactive content element is embedded. Accordingly, the user may get "stuck" moving/scrolling inside the interactive content element instead of continuing to navigate the parent document.

Consider, for example, a webpage comprising an interactive map displayed on a screen of a computing device. The user may want to navigate down the webpage; however, the user may attempt to scroll while the interactive map is displayed under a mouse pointer displayed on the screen or under a touchpoint on a touch screen. As a result, the user may get "stuck" scrolling the interactive map rather than scrolling down the webpage. When using a small form factor device, such as a mobile phone, inadvertent scrolling of an interactive content element may be further exacerbated, for example, due to interactive content elements taking up a larger portion of a limited screen space. Accordingly, getting "stuck" may occur more frequently, and getting "unstuck" can be challenging.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to a device, method, and computer-readable medium to improve computer efficiency for document navigation. In particular, aspects are directed to automatically applying a transparent overlay to an interactive content element to prevent inadvertent interaction with the interactive content element during a scrolling operation. According to an example, the transparent overlay is applied to the interactive content element upon determining that a user's intent is to navigate past the interactive content element, thus providing mitigation of a "scroll trap" experience where the user gets "stuck" scrolling within the interactive content element.

A document comprising at least one interactive content element, such as an embedded web content object, an embedded video, an embedded application content object, etc., is displayed on a computing device. In one example, when a scrolling operation is detected, the transparent overlay is applied to displayed interactive content elements such that a user is able to navigate past the interactive content element(s) without inadvertently selecting or scrolling within the interactive content element(s). Further, a determination is made as to whether to automatically remove the transparent overlay for allowing user interaction with the interactive content element.

In another example, custom-shaped transparent overlays are applied to interactive content elements, wherein controls are exposed for user-interaction. Accordingly, the risk of inadvertent interaction with the interactive content elements is reduced.

Automatically applying and removing a transparent overlay to an interactive content element in a document provides an intuitive user interface and improves computer efficiency for navigating the document. For example, automatically applying and removing a transparent overlay to an interactive content element enables users to perform a scrolling action with minimal effort, wherein expected navigation results are delivered. Users do not have to repeat a scrolling action or have to find a way to back out of an unintended interaction to get the results they want.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 3A and 3B illustrate an overlay applied to an example interactive content element;

DETAILED DESCRIPTION

Figure 1:
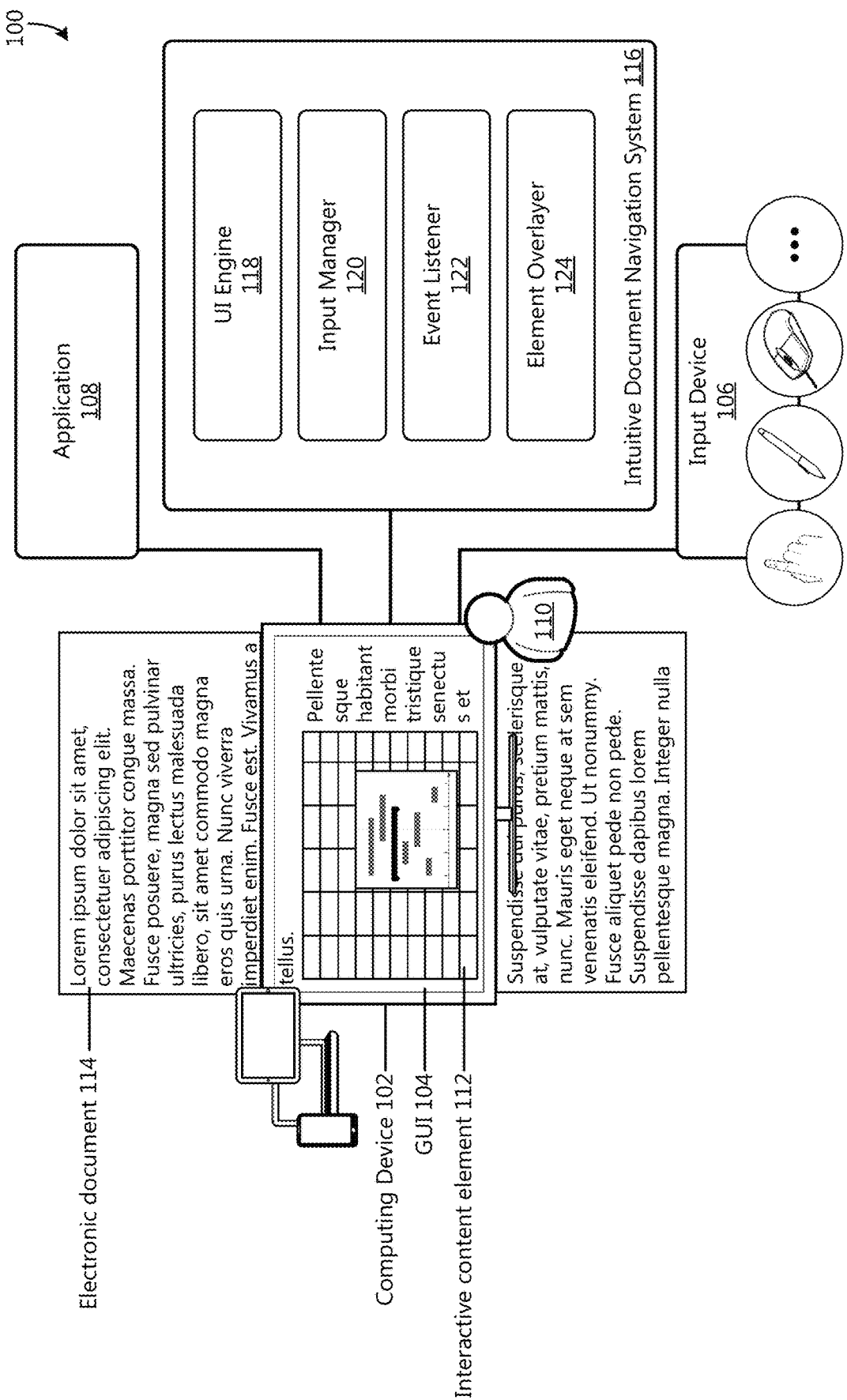
FIG. 1 is a block diagram of a representation of an environment in communication with an intuitive document navigation system for providing improved computer efficiency for document navigation.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage medium for improved computer efficiency for document navigation. A transparent overlay is automatically applied to an interactive content element to prevent inadvertent interaction with the element during scrolling operations. In some examples, upon determining that a user's intent is to navigate a parent document comprising an embedded interactive content element, the overlay is applied, and user-interaction with the interactive content element is temporarily disabled. Upon determining that the user's intent is to interact with the interactive content element, the overlay is removed, and user-interaction with the interactive content element is enabled. When the overlay is removed, a contextual hint, such as a user interface control, can be provided to the user to indicate how to continue navigating the parent document. In other examples, the transparent overlay is customized according to each interactive content element, wherein user controls associated with the interactive content element are exposed, and wherein the overlay is perpetually applied to the interactive content element.

With reference now to FIG. 1, a simplified block diagram of one example environment 100 in communication with an intuitive document navigation system 116 is shown. As illustrated, the example environment includes a computing device 102. The computing device 102 illustrated in FIG. 1 is illustrated as a desktop computer; however, as should be appreciated, the computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications 108 for performing a variety of tasks. The hardware of these computing devices is discussed in greater detail in regard to FIGS. 7, 8A, 8B, and 9.

A user 110 may use an application 108 on the computing device 102 for a variety of tasks, which may include, for example, to write, calculate, draw, take and organize notes, prepare and organize presentations, send and receive electronic mail, browse web content, make music, and the like.

Applications 108 may include thick client applications, which may be stored locally on the computing device 102, or may include thin client applications (i.e., web applications) that reside on a remote server and accessible over a network, such as the Internet or an intranet. A thin client application may be hosted in a browser-controlled environment or coded in a browser-supported language and reliant on a common web browser to render the application 108 executable on the computing device 102. According to an aspect, the application 108 is a program that is launched and manipulated by an operating system, and manages content within an electronic document 114 and published on a display screen. According to examples, a graphical user interface (GUI) 104 is provided for enabling the user 110 to interact with functionalities of the application 108 and with electronic documents 114 through manipulation of graphical icons, visual indicators, and the like.

Content in an electronic document 114 may vary according the application 108 used to provide the electronic document 114. The content may comprise one or more objects present or embedded in the electronic document 114 including, but not limited to: text (including text containers), numeric data, macros, images, movies, sound files, and metadata. According to one example, the electronic document 114 acts as a container document including one or more embedded interactive content elements 112, for example, inline frame (iframe) elements, application add-in elements, movies, sound files, images, or other interactive objects.

In various aspects, the data comprising the content are stored in an elemental form by the electronic document, such as in Extensible Markup Language (XML), Java Script Object Notation (JSON) elements, HyperText Markup Language (HTML), or another declaratory language interpretable by a schema. The schema may define sections or content items via tags and may apply various properties to content items via direct assignment or hierarchical inheritance. For example, an object comprising text may have its typeface defined in its element definition (e.g., "<text typeface=garamond>example text</text>") or defined by a stylesheet or an element above the object in the document's hierarchy from which the element depends.

With reference still to FIG. 1, an application 108 includes or is in communication with an intuitive document navigation system 116, operative to provide intuitive transparent overlay application to interactive content elements for improved computer efficiency for document navigation. In one example, the computing device 102 includes an intuitive scrolling application programming interface (API), operative to enable the application 108 to employ intuitive interactive content element transparent overlay application via stored instructions.

According to aspects, the intuitive document navigation system 116 includes: a user interface (UI) engine 118 operative to generate a display of an electronic document 114 and one or more embedded interactive content elements 112; an input manager 120 operative to receive user input; an event listener 122 operative to listen for specific events; and an element overlayer 124 operative to, in response to detection of specific events, apply or remove a transparent overlay to a displayed interactive content element 112.

The UI engine 118 is illustrative of a software module, system, or device operative to generate a GUI display of an electronic document 114. According to an example, when an electronic document 114 is opened in an application 108, the UI engine 118 displays at least a portion of the content in the document 114 in a display space, such as an application window. A user 110 may selectively modify the view of the electronic document 114 in the display space, for example, by zooming in or out of the document, scrolling to another location in the document, etc. Accordingly, the UI engine 118 updates the GUI 104 to display the content within the portion of the electronic document 114 selected to be displayed in the display space. When an interactive content element 112 is included in the electronic document 114, and at least a portion of the interactive content element 112 is within a part of the document that is selected to be displayed in the display space, the UI engine 118 is further operative to update the GUI 104 to display (at least a portion of) the interactive content element 112.

Figure 2A:
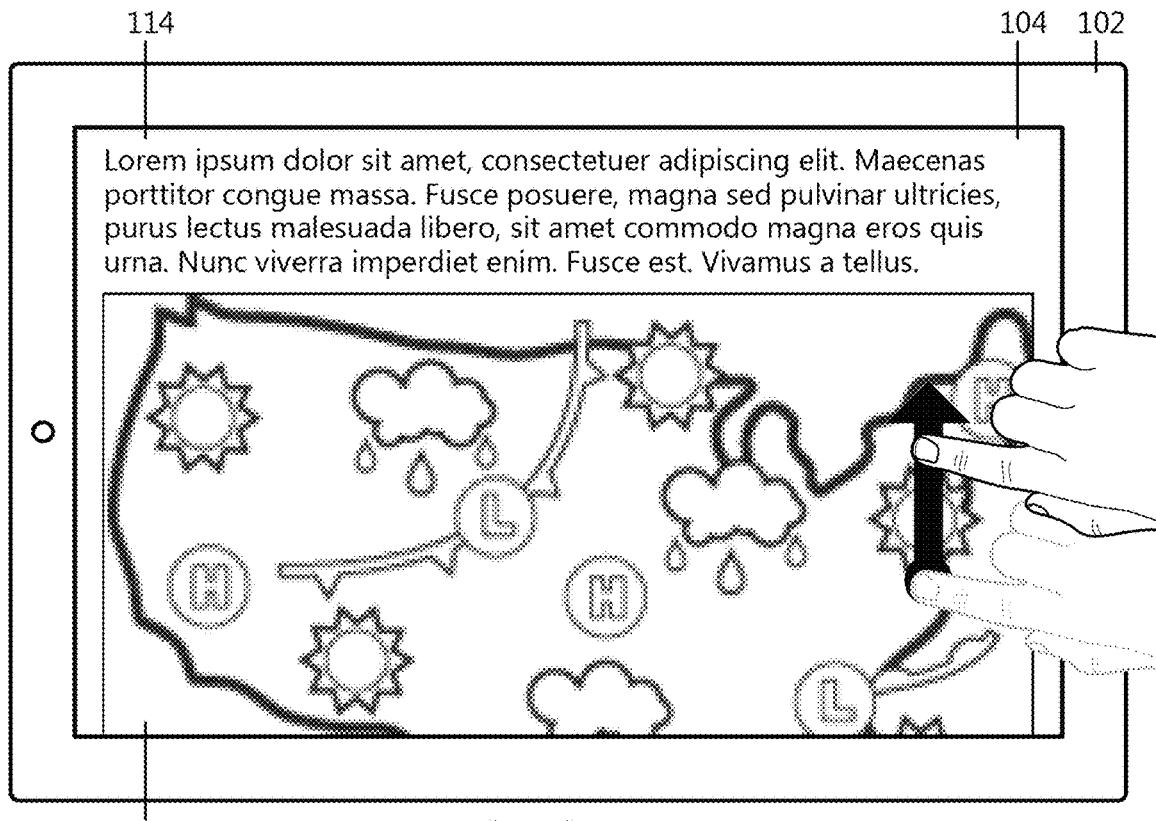
FIGS. 2A and 2B illustrate an example of an inadvertent interaction with an interactive content element embedded in a document.
Figure 2B:
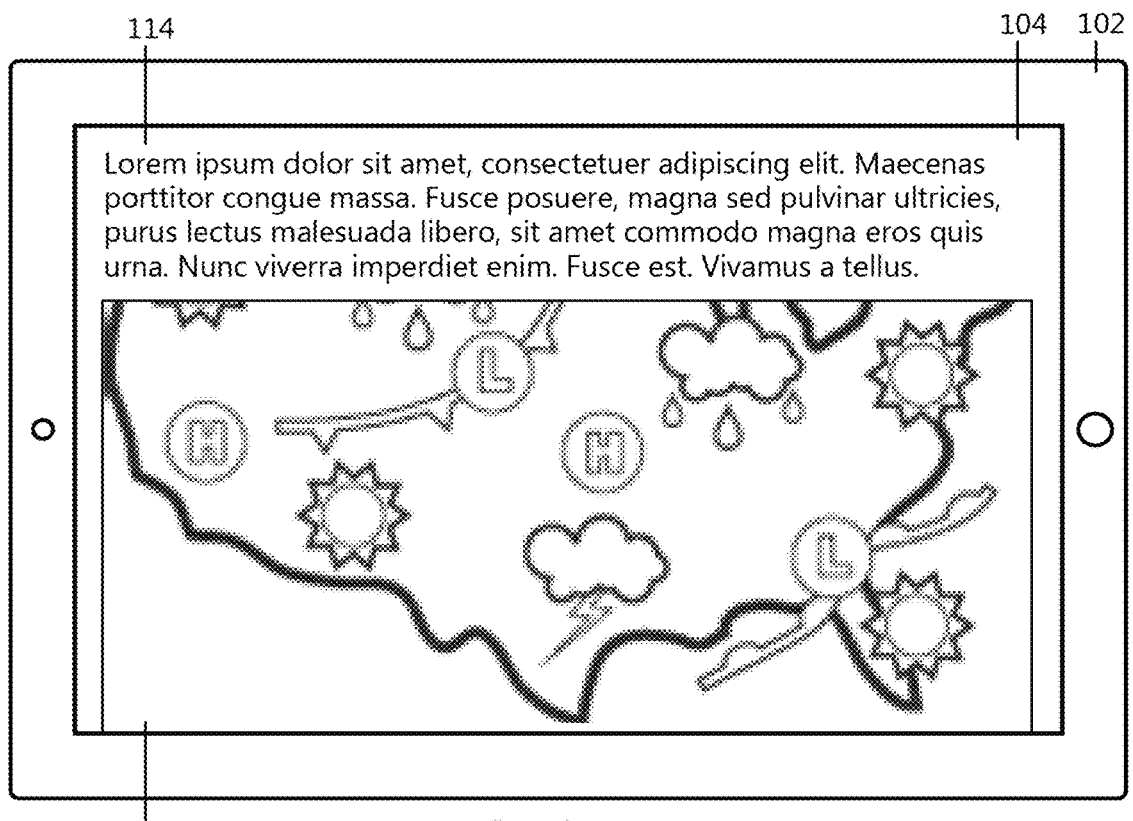

The element overlayer 124 is illustrative of a software module, system, or device operative to apply a transparent overlay over an interactive content element 112 to prevent inadvertent interaction with the interactive content element 112. An example of an inadvertent interaction with an interactive content element 112 is illustrated in FIGS. 2A and 2B. With reference now to FIG. 2A, a user 110 may view an electronic document 114 comprising at least one interactive content element 112 on a computing device 102. For example, the example electronic document 114 illustrated in FIG. 2A includes an embedded map object, and is displayed in a GUI 104 on a mobile computing device. The user 110 may wish to navigate through the document 114, for example, by using a finger to touch a touch-sensitive screen of the computing device 102 and slide or swipe the finger to scroll past the embedded map (i.e., interactive content element 112).

With reference now to FIG. 2B, while trying to navigate past the embedded map, the user 110 unintentionally has gotten "stuck" inside the interactive content element 112. For example and as illustrated, instead of scrolling the electronic document 114, the scrolling input has been applied to the interactive content element 112, and the embedded map object is shown scrolled down. As can be appreciated, when expected navigation results are not delivered, the user 110 may become frustrated. Further, computer efficiency is decreased and additional computer processing is required due to inadvertent scrolling input with the interactive content element 112, undoing the inadvertent input, and additional input for producing the intended results.

According to an example and as illustrated in FIGS. 3A-3B, the element overlayer 124 applies a transparent overlay 302 to an interactive content element 112 when at least a portion of the interactive content element 112 is displayed in the GUI 104, wherein the overlay 302 prevents inadvertent interaction with the interactive content element 112.

Figure 3C:
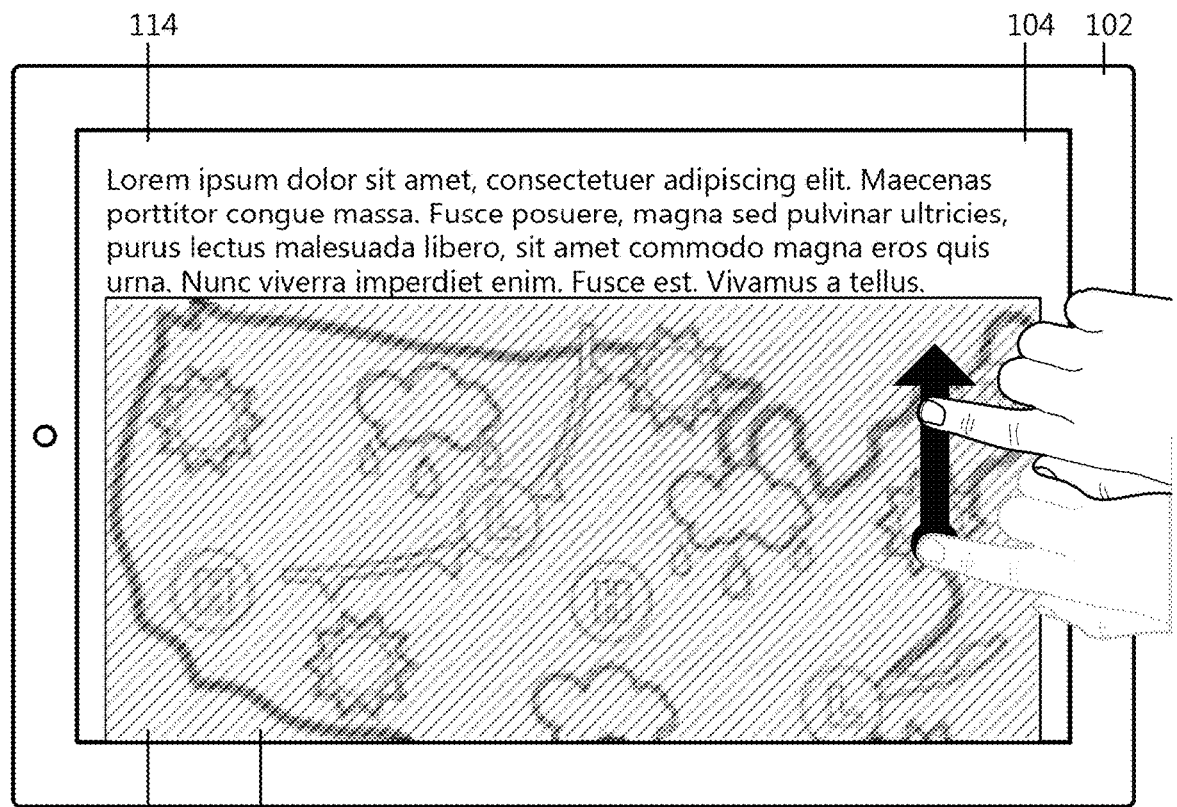
FIGS. 3C and 3D illustrate an example of the overlay preventing an inadvertent interaction with an interactive content element embedded in a document.
Figure 3D:
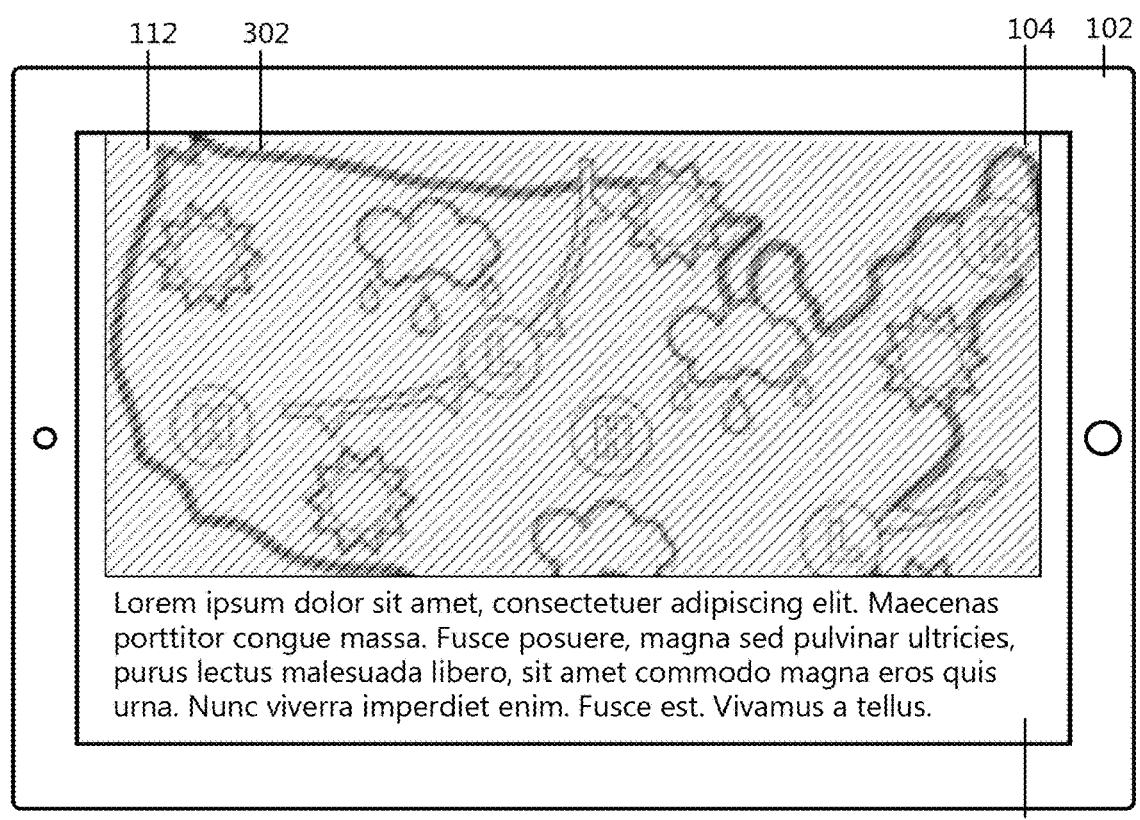

With reference now to FIG. 3C, when the overlay 302 is applied to the interactive content element 112 and the user 110 tries to navigate through the document 114, for example, by using a finger to touch a touch-sensitive screen of the computing device 102 and slide or swipe the finger to scroll or pan past the interactive content element 112, the overlay 302 provides a barrier between the user input and the interactive content element 112, thus preventing activation of the interactive content element 112. For example and as illustrated in FIG. 3D, even though the user-controlled cursor (e.g., touch-point on the touch-screen interface) is located on the interactive content element 112 during the scrolling or panning operation, the user input is applied to the electronic document 114. Accordingly, the user 110 is enabled to navigate through the document 114 without inadvertently interacting with the interactive content element 112. According to an example, the overlay 302 acts as a continuation of the outer document 114, such that scrolling, touch, and other interactions applied in the vicinity of the overlay 302 operate on the outer document 114.

The element overlayer 124 is further operative to make a determination as to whether to remove the overlay 302 from the interactive content element 112, and to remove the overlay 302 when a positive determination is made to do so. Further, the element overlayer 124 is operative to make a determination as to whether to reapply the overlay 302 to the interactive content element 112, and to reapply the overlay 302 when a positive determination is made to reapply the overlay 302. Removal and reapplication of the overlay 302 will be described in further detail below.

Figure 4:
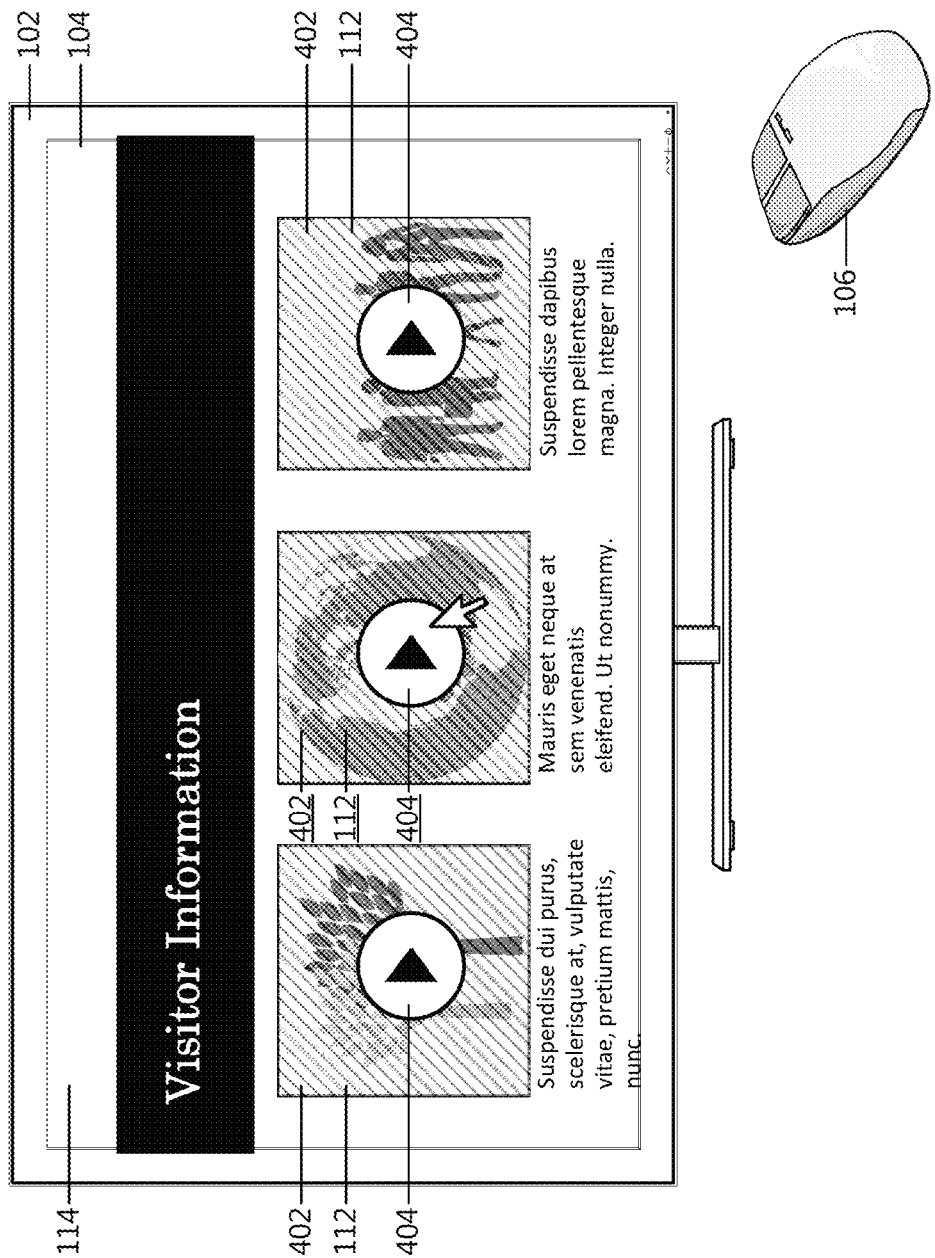
FIG. 4 illustrates an example of customized overlays applied to interactive content elements.

In another example and as illustrated in FIG. 4, the element overlayer 124 applies a customized overlay 402 to each interactive content element 112 in an electronic document 114, wherein a customized overlay 402 is ever-present on an interactive content element 112. According to an example, the customized overlay 402 is custom-shaped to the interactive content element 112, and comprises cut-outs over interaction controls 404 associated with the interactive content element 112, such that the interaction controls 404 are persistently exposed to the user 110 when the interactive content element 112 is displayed in the GUI 104.

In the example illustrated in FIG. 4, the interactive content elements 112 included in the example electronic document 114 are video objects, and the electronic document 114 is an interactive presentation document, for example, created via a digital storytelling application and viewable in a web browser application. The element overlayer 124 applies a customized overlay 402 to each interactive content element 112, wherein the interaction control 404 (e.g., the play button) is exposed through the customized overlay 402 such that the user 110 is enabled to interact with the interaction control 404. According to an aspect, the hit target area for interaction with the interactive content element 112 is limited to the exposed interaction control 404, thus reducing inadvertent interaction with the interactive content element 112 when navigating or interacting with the electronic document 114.

The input manager 120 is illustrative of a software module, system, or device operative to receive user input. According to aspects, the user input includes a physical act or motion performed on or by an input device 106 at a position of a user-controlled cursor (such as a mouse cursor, a touch-point on a touch-screen interface, a focus-point on a motion gesture detection device, or head, eye, or gaze tracking device). Various user interface technologies may be utilized. For example, user input may be received via hardware input devices, such as mice, keyboards, remote controls, pen/stylus, and the like. As another example, user input may be received via natural input devices/methods that enable a user 110 to interact with the computing device 102 in a "natural" manner, such as those relying on speech recognition, touch and stylus recognition, gesture recognition both on screen and adjacent to the screen, air gestures, head and eye tracking, voice and speech, vision, touch, hover, gestures, and machine intelligence.

According to some examples, the user 110 uses an input device 106 to select/interact with an on-screen object, such as an interactive content element 112. For example, selection of an embedded object (e.g., interactive content element 112) causes an activation of the object (e.g., sound clips can be listened to, video clips can be viewed). As another example, selection of an embedded object (e.g., interactive content element 112) enables in-place navigation or in-place editing of the object, wherein received user input is directed to the embedded object, such as scrolling through content of the interactive content element 112 via an input device 106 (e.g., mouse, finger, pen/stylus, gesture, gaze), inputting content in the interactive content element 112 via keyboard input, editing interactive content element 112 content via keyboard input, editing formatting of interactive content element 112 content via a selection of formatting controls, etc.

In other examples, the user 110 uses an input device 106 to manipulate the display of or navigate the electronic document 114, for example, via a scrolling or panning operation. Non-limiting examples of a user input for a scrolling or panning operation include turning a mouse scroll wheel, selecting up/down/left/right arrow keys, selecting Page Up/Page Down|Home/End keys, dragging a scroll bar, selecting up/down arrows on a scroll bar, selecting negative space of a scroll bar, selecting a left-mouse button while sliding a mouse across a surface, dragging/sliding one or more fingers or pen/stylus on a touch-sensitive interface, movement of a hand or gaze along an axis, etc.

According to aspects, the input manager 120 is operative to receive user input from the input device 106, and communicate the user input in the form of messages. In one example, the input manager 120 is operative to receive user input, identify the input and the position of the user-controlled cursor (e.g., mouse cursor, touch-point, focus-point), and post a message directed to the window or frame below which the cursor is located. For example, if an interactive content element 112 is located below the cursor, the input manager 120 may direct the user input message to the interactive content element 112. As another example, if an interactive content element 112 is located below the cursor and an overlay 302,402 is applied to the interactive content element 112, the input manager 120 may direct the user input message to the electronic document 114 containing the interactive content element 112.

The event listener 122 is illustrative of a software module, system, or device operative to listen for specific events, and notify the element overlayer 124 when the specific events occur. In one example, the event listener 122 listens for specific user input event messages posted by the input manager 120, such as scrolling events, panning events, hovering events, touch events, pointer events, etc. According to one aspect, the element overlayer 124 is operative to make a determination as to whether to persist application of an overlay 302 over an interactive content element 112 based at least in part on detection of specific user input events. For example, when a scroll or pan event is received and communicated to the element overlayer 124, the element overlayer 124 is operative to determine to continue to persist application of the overlay 302 over the interactive content element 112.

According to another aspect, the element overlayer 124 is operative to make a determination as to whether to remove an overlay 302 from an interactive content element 112 based at least in part on detection of specific user input events, or on detection of an absence of specific user input events. In one example, when a pause is detected, such as a hover or when a user input is not received within a predetermined timespan, the element overlayer 124 is operative to determine to remove the overlay 302 from the interactive content element 112. In another example, when a selection or touch event is received when the user-controlled cursor is over the interactive content element 112, a determination is made that the user 110 is trying to interact with the interactive content element 112. Accordingly, the element overlayer 124 is operative to remove the overlay 302 from the interactive content element 112 to allow interaction with the interactive content element 112.

Figure 5A:
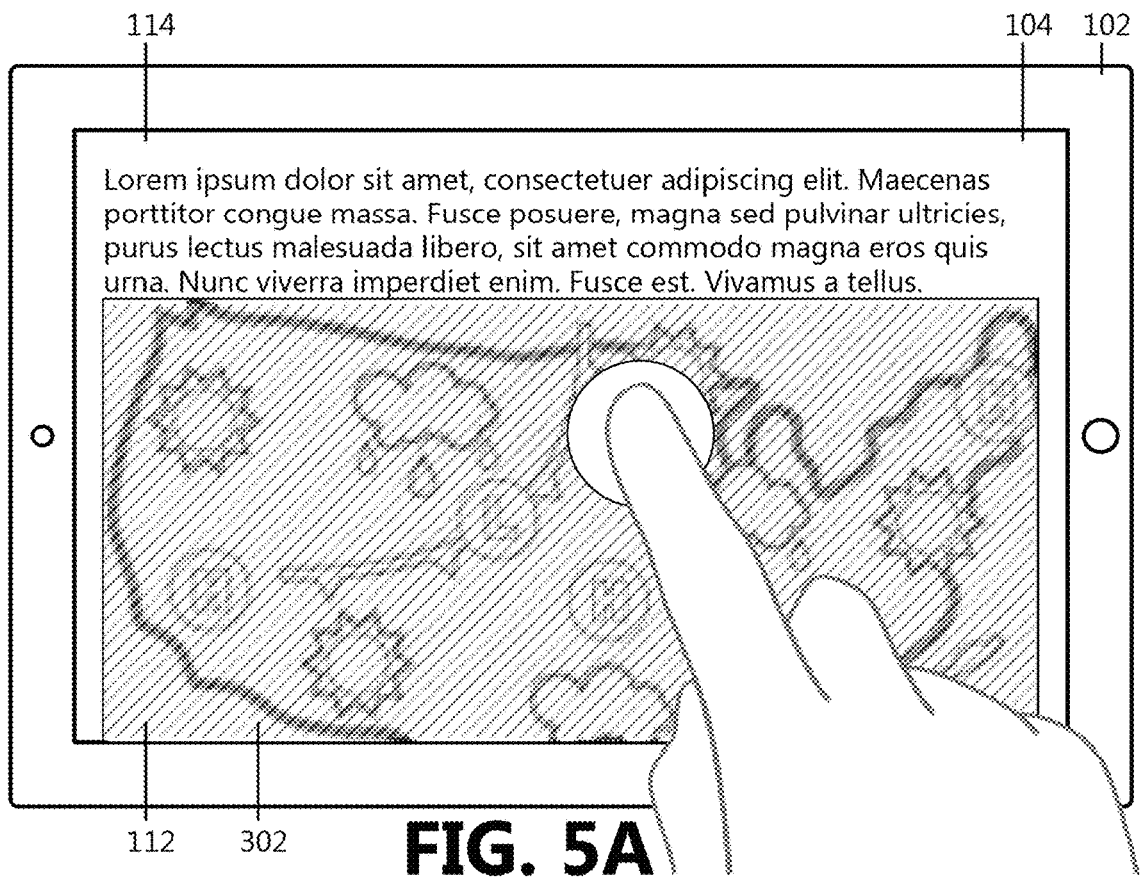
FIGS. 5A and 5B illustrate an example of removing an overlay from an interactive content element.
Figure 5B:
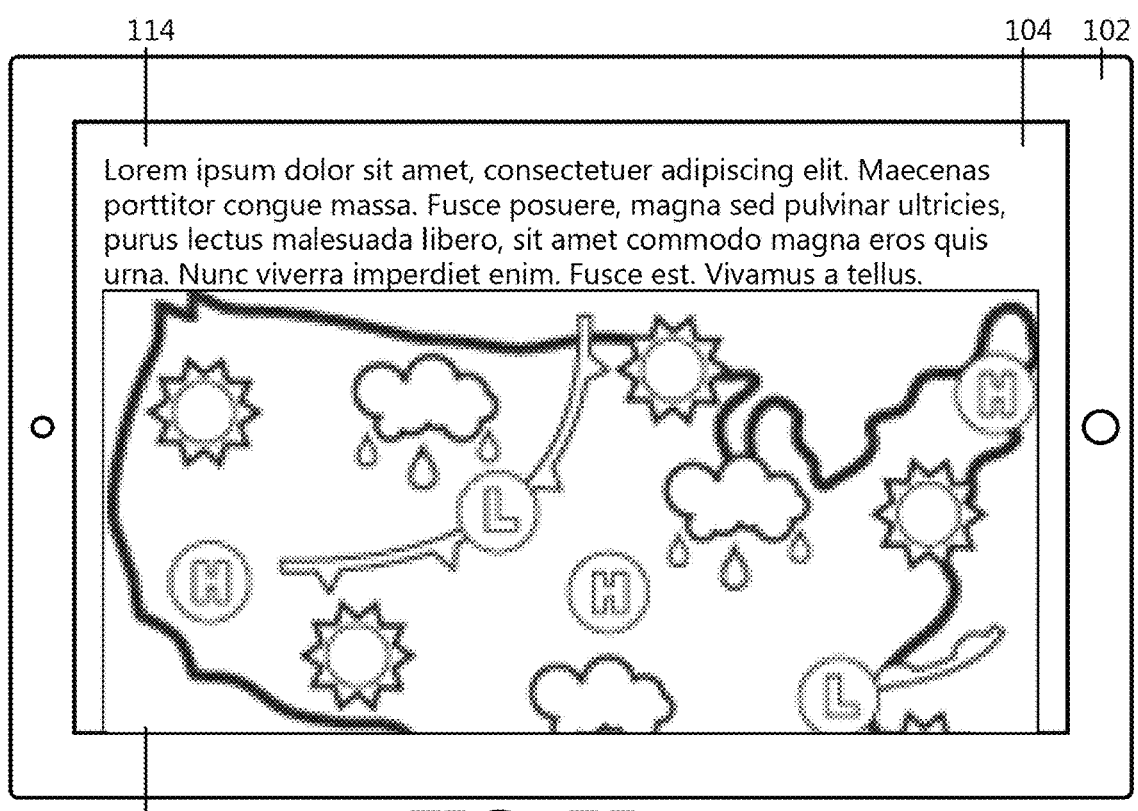

With reference now to FIGS. 5A-5B, an example of removing an overlay 302 from an interactive content element 112 is illustrated. For example, in FIG. 5A, the user 110 taps on the interactive content element 112 when an overlay 302 is applied to the interactive content element 112. In response and as illustrated in FIG. 5B, the element overlayer 124 removes the overlay 302 to enable user interaction with the interactive content element 112.

Figure 5C:
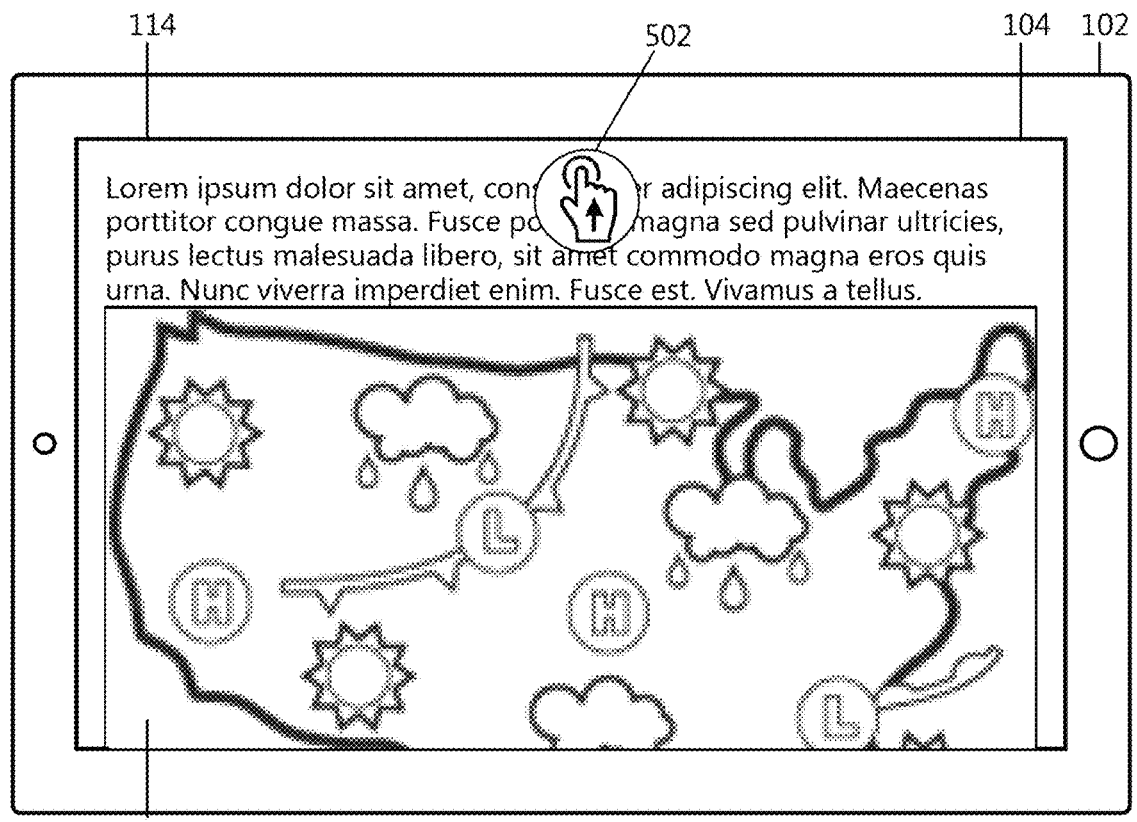
FIGS. 5C and 5D illustrate examples of providing a visual indication to the user for how to continue document navigation upon removal of an overlay from an interactive content element.
Figure 5D:

In some examples and as illustrated in FIG. 5C, upon removal of the overlay from an interactive content element, the UI engine 118 is further operative to update the GUI 104 to display a visual indicator 502 hinting at how to continue document navigation. In one example, the visual indicator 502 may be embodied as a pulsing or flashing navigation button or as a contextual gesture hint that educates the user 110 where to click or touch to continue viewing the electronic document 114. In some examples, the visual indicator 502 is displayed a predetermined number of times, for example, to familiarize the user 110 with functionalities of the system.

In some examples, upon detection of a user-forced removal of an overlay 302, such as when the user 110 taps/clicks on an interactive content element 112 when an overlay 302 is applied to the interactive content element 112, the intuitive document navigation system 116 is further operative to communicate the user input event message to the interactive content element 112 after removing the overlay 302, such that the intended user interaction with the interactive content element 112 is enabled. For example, if the interactive content element 112 is an embedded video object, and the user 110 taps or clicks on a play button displayed on the video object, a determination is made that the user's intention is to play the video. Accordingly, the overlay 302 is removed, and the user input event message is posted to the video object for automatic play of the embedded video.

According to an aspect, the element overlayer 124 is operative to make a determination as to whether to reapply an overlay 302 to an interactive content element 112 based at least in part on detection of specific user input events. For example, when a scroll or pan event is received and communicated to the element overlayer 124, the element overlayer 124 is operative to determine to reapply the overlay 302 to the interactive content element 112.

In some examples, the event listener 122 is operative to listen for event messages from the interactive content element 112 to determine when to reapply an overlay 302. For example, if the interactive content element 112 is an embedded video object, when the video has ended play, the video object can send a communication to the intuitive document navigation system 116 that play has ended and to reapply the overlay 302. As will be appreciated, the examples illustrated in FIGS. 2A-B, 3A-B, 4, and 5A-5C are non-limiting illustrations; other GUIs with different elements and arrangements thereof may be used in conjunction with the present disclosure.

Figure 6:
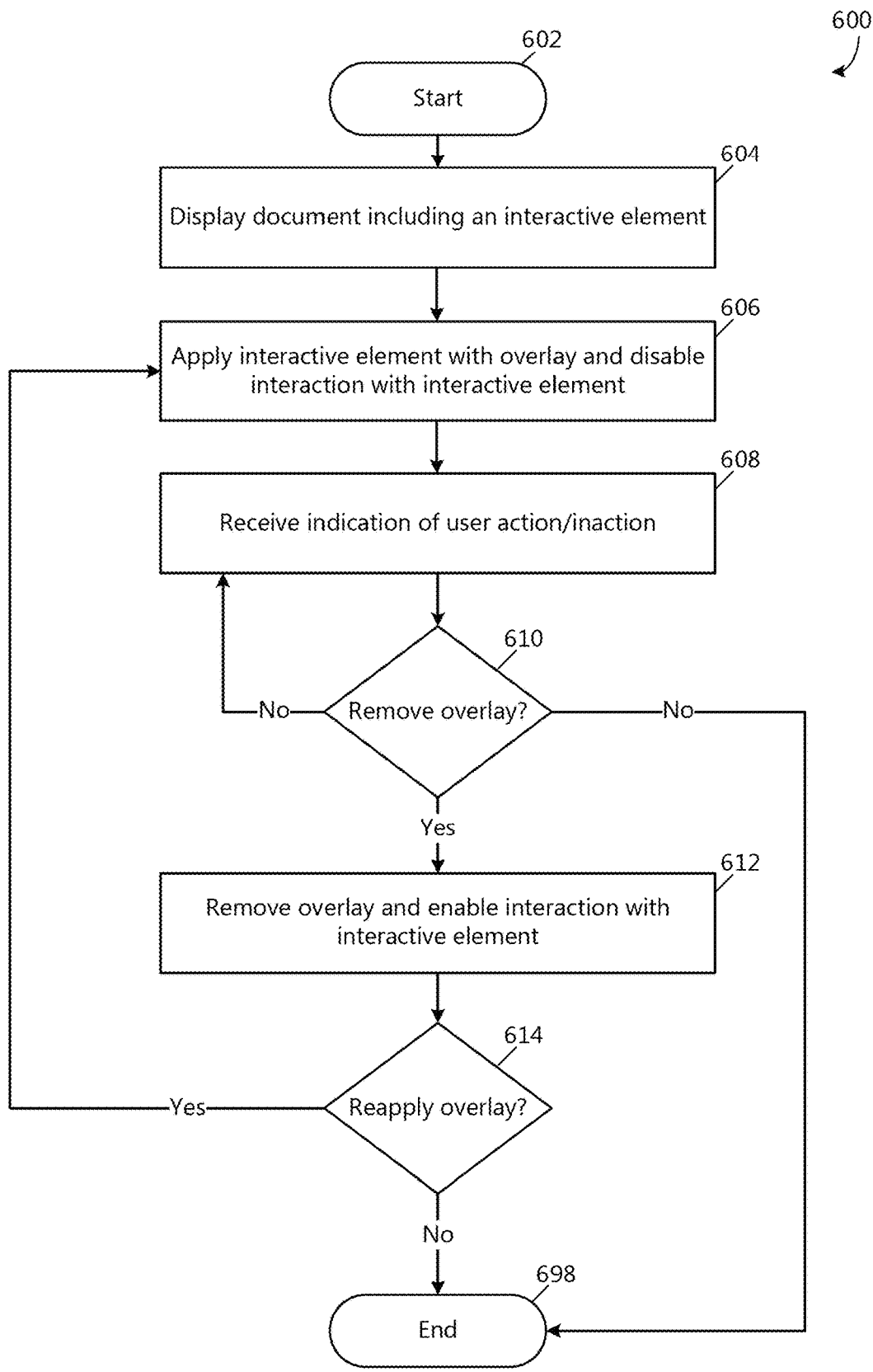
FIG. 6 is a flow chart showing general stages involved in an example method for improving accuracy and computer efficiency in selecting a grouping of digital strokes.

Having described an example operating environment 100, various components of the intuitive document navigation system 116, and various GUI examples, FIG. 6 is a flow chart showing general stages involved in an example method 600 for improving computer efficiency for document navigation. With reference now to FIG. 6, the method 600 begins at start OPERATION 602, and proceeds to OPERATION 604, where an electronic document 114 comprising at least one embedded interactive content element 112 is opened in an application 108 and displayed in a GUI 104. The at least one interactive content element 112 may be one of various types of objects, just as a map object, a video object, an audio object, a chart object, etc.

The method 600 proceeds to OPERATION 606, where an overlay 302 is applied to the interactive content element 112, and interaction with at least a portion of the interactive content element 112 is disabled. For example, if the overlay 302 is a customized overlay 402, an interaction control 404 associated with the interactive content element 112 may be persistently exposed to the user 110. However, if the overlay 302 is not a customized overlay 402, such as the example overlays 302 illustrated in FIGS. 3A-D, the overlay 302 provides a protective layer over all of the interactive content element 112 to prevent inadvertent interaction with the element 112.

The method 600 continues to OPERATION 608, where an indication of a user action or inaction is received. In one example, a user input, such as a scrolling event, panning event, hovering event, touch event, pointer event, etc., is received and communicated to the element overlayer 124. In another example, a lack of a user input within a predetermined time interval is detected and communicated to the element overlayer 124.

At DECISION OPERATION 610, a determination is made as to whether to remove the overlay 302 from the interactive content element 112. In some examples, the determination is made based on whether the overlay 302 is a customized overlay 402. If the overlay is a customized overlay 402, a determination is made to not remove the overlay. In other examples, the determination is made based on the user action or inaction identified at OPERATION 608. For example, if a scrolling or panning user input is received, a determination is made to persist the overlay 302. As another example, if a touch, selection, or click input on the interactive content element 112 is received, a determination is made to remove the overlay 302. As another example, if an indication of a hover event over the interactive content element 112 is received or if a predetermined time interval has passed without receiving an indication of an input event (e.g., a pause is detected), a determination is made to remove the overlay 302.

When a determination is made to persist the overlay 302 (e.g., to not remove the overlay), the method 600 ends at OPERATION 698 or returns to OPERATION 608, where further user actions are received. When a determination is made to remove the overlay 302, the method 600 proceeds to OPERATION 612, where the overlay 302 is removed from the interactive content element 112, and user interaction with the interactive content element 112 is enabled.

The method 600 continues to DECISION OPERATION 614, where a determination is made as to whether to reapply the overlay 302. According to an example, the determination to reapply the overlay 302 is based on determining that the user's intent is to navigate past the interactive content element 112, thus mitigating a "scroll trap" experience where the user 110 gets "stuck" scrolling within the interactive content element 112. For example, when a scroll or pan event is received and communicated to the element overlayer 124, a determination is made to reapply the overlay 302 to the interactive content element 112. When a positive determination is made to reapply the overlay 302, the method 600 returns to OPERATION 606, where the overlay 302 is applied to the interactive content element 112, and user interaction with the interactive content element 112 is disabled. When a negative determination is made (e.g., to not reapply the overlay 302), the method 600 ends at OPERATION 698.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
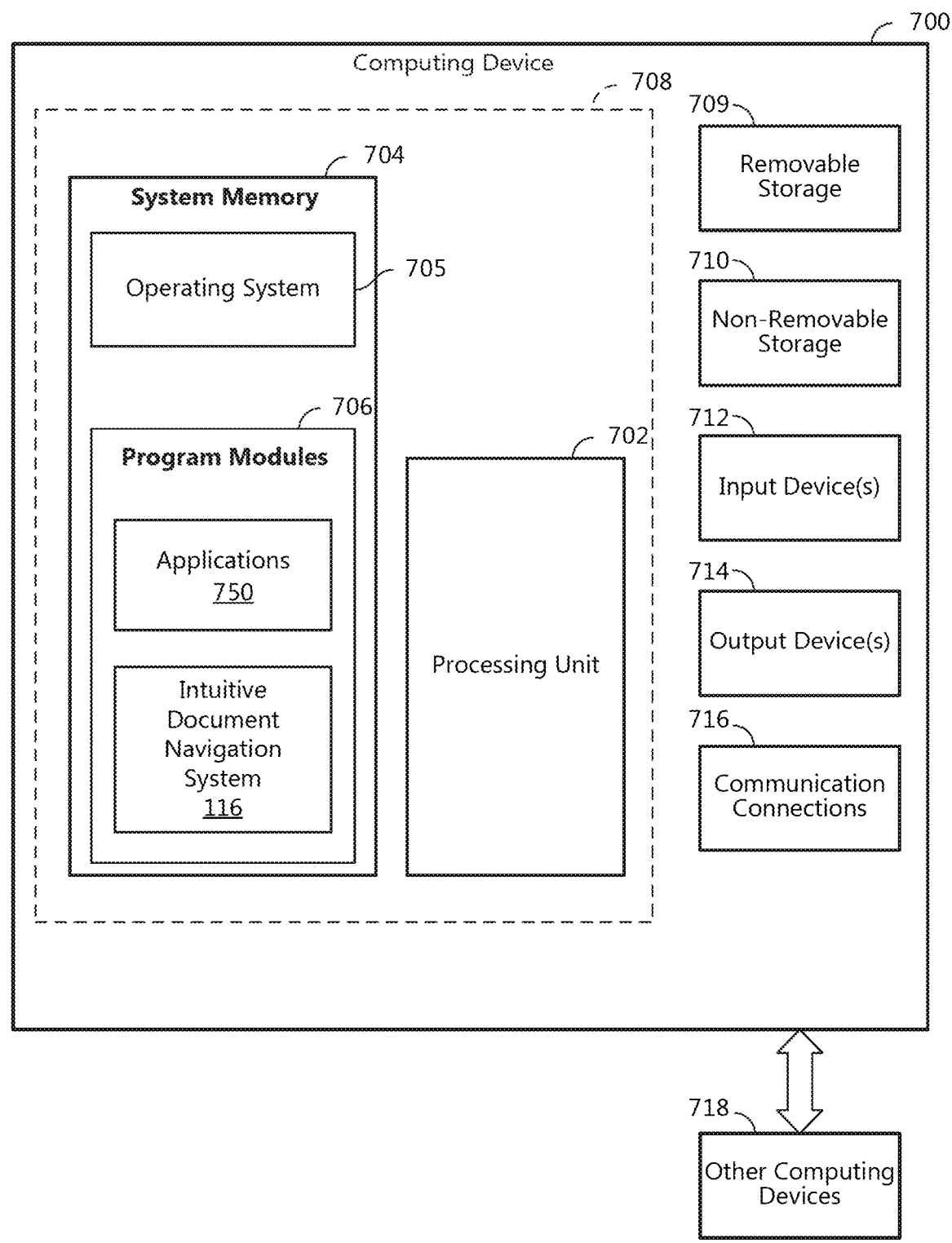
FIG. 7 is a block diagram illustrating example physical components of a computing device.
Figure 8A:
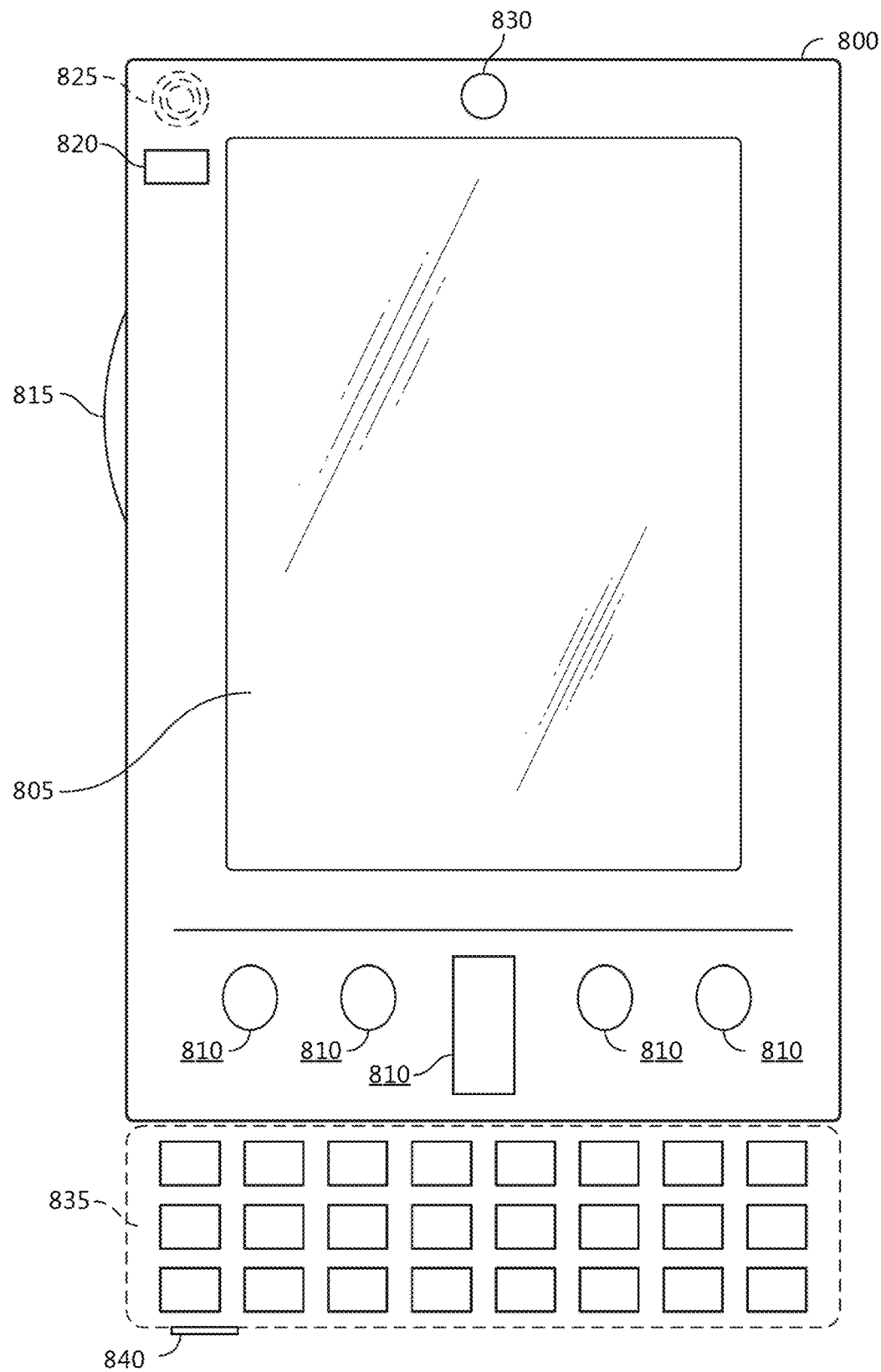
FIGS. 8A and 8B are block diagrams of a mobile computing device.
Figure 8B:
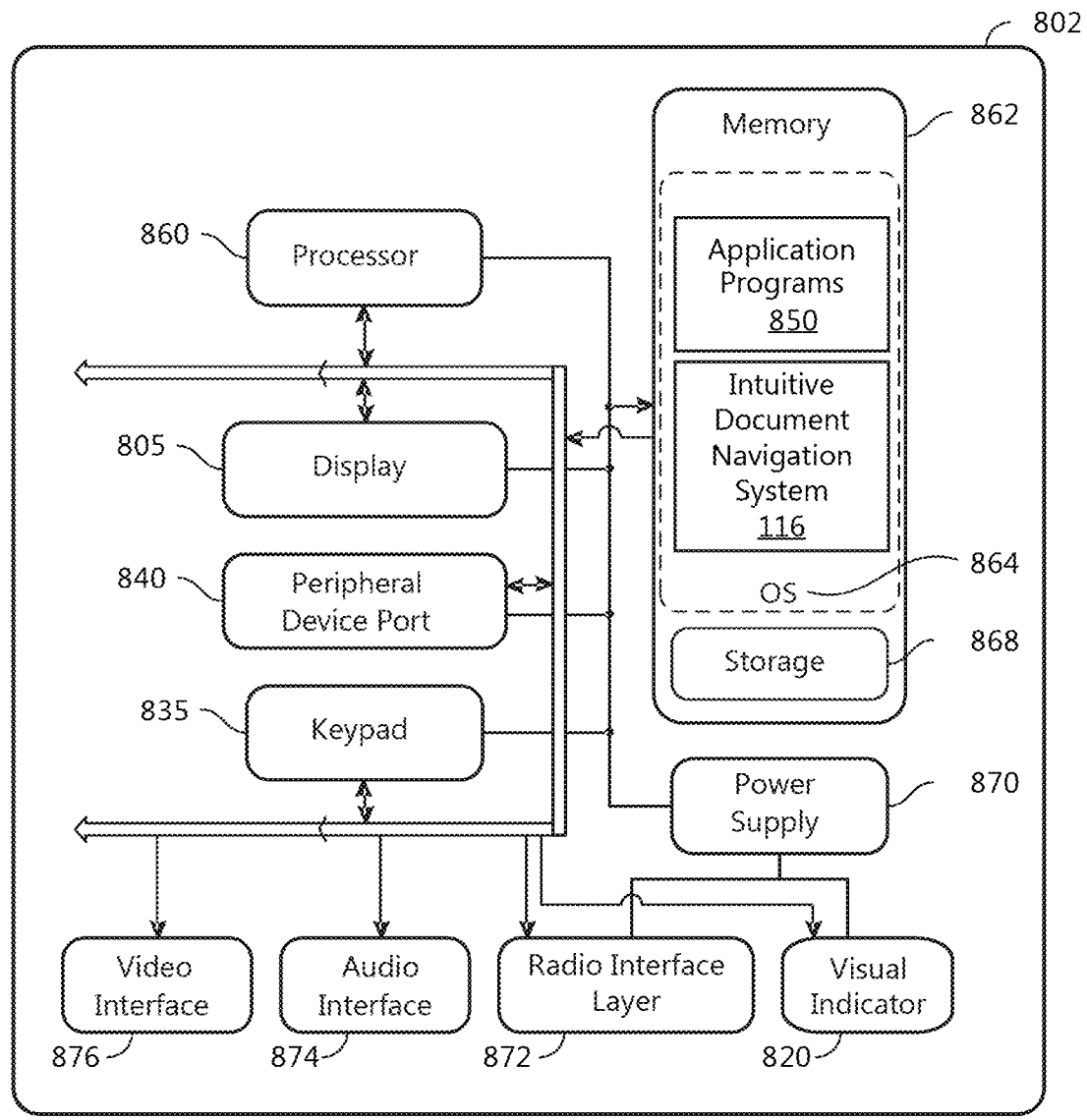
Figure 9:
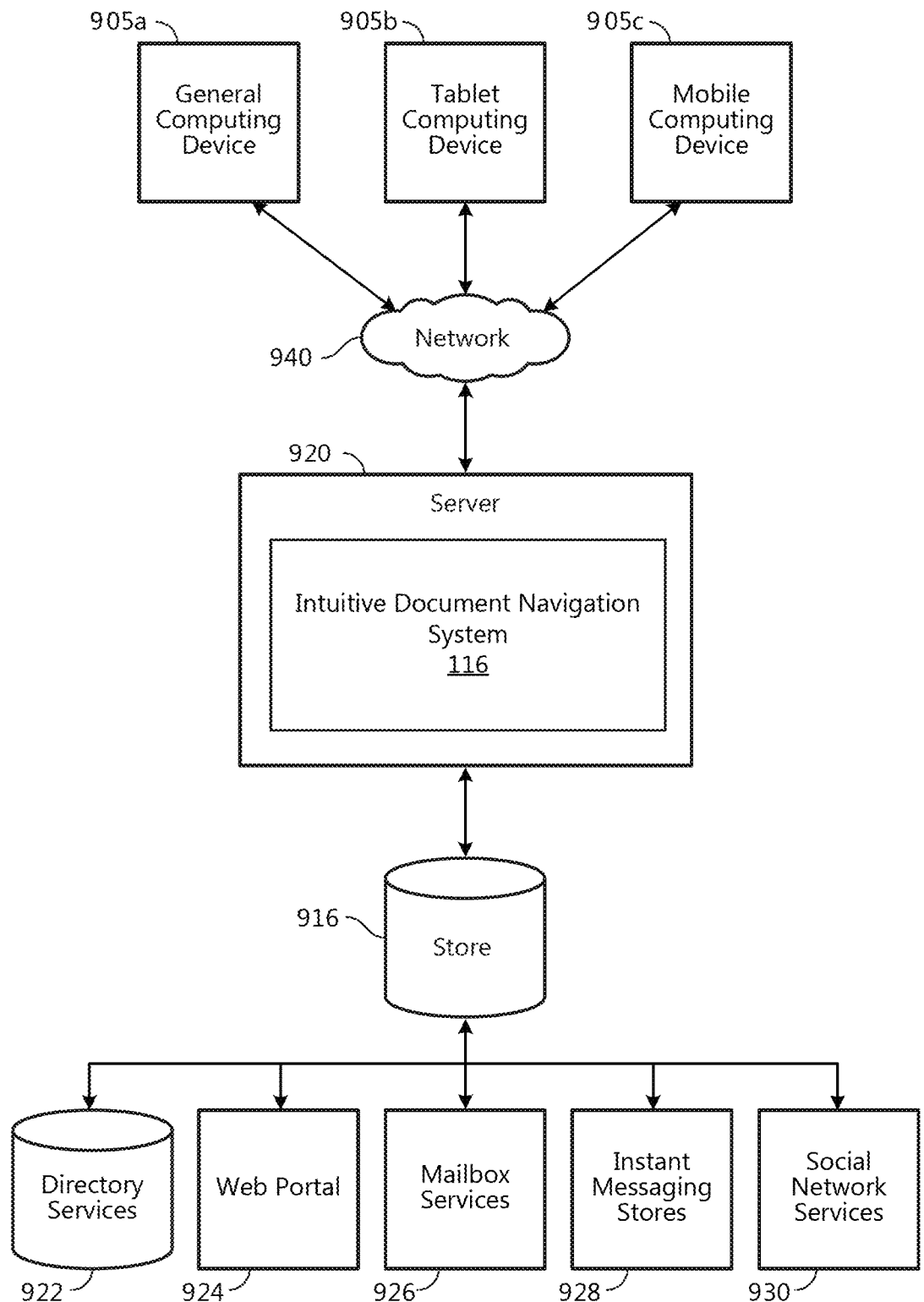
FIG. 9 is a block diagram of a distributed computing system.

FIGS. 7-9 and the associated descriptions provide a discussion of a variety of operating environments in which examples are practiced. However, the devices and systems illustrated and discussed with respect to FIGS. 7-9 are for purposes of example and illustration and are not limiting of a vast number of computing device configurations that are utilized for practicing aspects, described herein.

FIG. 7 is a block diagram illustrating physical components (i.e., hardware) of a computing device 700 with which examples of the present disclosure are be practiced. In a basic configuration, the computing device 700 includes at least one processing unit 702 and a system memory 704. According to an aspect, depending on the configuration and type of computing device, the system memory 704 comprises, but is not limited to, volatile storage (e.g., random access memory), non-volatile storage (e.g., read-only memory), flash memory, or any combination of such memories. According to an aspect, the system memory 704 includes an operating system 705 and one or more program modules 706 suitable for running software applications 750. According to an aspect, the system memory 704 includes the intuitive document navigation system 116. The operating system 705, for example, is suitable for controlling the operation of the computing device 700. Furthermore, aspects are practiced in conjunction with a graphics library, other operating systems, or any other application program, and is not limited to any particular application or system. This basic configuration is illustrated in FIG. 7 by those components within a dashed line 708. According to an aspect, the computing device 700 has additional features or functionality. For example, according to an aspect, the computing device 700 includes additional data storage devices (removable and/or non-removable) such as, for example, magnetic disks, optical disks, or tape. Such additional storage is illustrated in FIG. 7 by a removable storage device 709 and a non-removable storage device 710.

As stated above, according to an aspect, a number of program modules and data files are stored in the system memory 704. While executing on the processing unit 702, the program modules 706 (e.g., intuitive document navigation system 116) perform processes including, but not limited to, one or more of the stages of the method 600 illustrated in FIG. 6. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 7 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 700 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 700 has one or more input device(s) 712 such as a keyboard, a mouse, a pen, a sound input device, a touch input device, etc. The output device(s) 714 such as a display, speakers, a printer, etc. are also included according to an aspect. The aforementioned devices are examples and others may be used. According to an aspect, the computing device 700 includes one or more communication connections 716 allowing communications with other computing devices 718. Examples of suitable communication connections 716 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. According to an aspect, any such computer storage media is part of the computing device 700. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, a tablet personal computer, a laptop computer, and the like, with which aspects may be practiced. With reference to FIG. 8A, an example of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. According to an aspect, the display 805 of the mobile computing device 800 functions as an input device (e.g., a touch screen display). If included, an optional side input element 815 allows further user input. According to an aspect, the side input element 815 is a rotary switch, a button, or any other type of manual input element. In alternative examples, mobile computing device 800 incorporates more or less input elements. For example, the display 805 may not be a touch screen in some examples. In alternative examples, the mobile computing device 800 is a portable phone system, such as a cellular phone. According to an aspect, the mobile computing device 800 includes an optional keypad 835. According to an aspect, the optional keypad 835 is a physical keypad. According to another aspect, the optional keypad 835 is a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some examples, the mobile computing device 800 incorporates a vibration transducer for providing the user with tactile feedback. In yet another example, the mobile computing device 800 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 800 incorporates peripheral device port 840, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one example of a mobile computing device. That is, the mobile computing device 800 incorporates a system (i.e., an architecture) 802 to implement some examples. In one example, the system 802 is implemented as a "smart phone" capable of running one or more applications (e.g., browser, e-mail, calendaring, contact managers, messaging clients, games, and media clients/players). In some examples, the system 802 is integrated as a computing device, such as an integrated personal digital assistant (PDA) and wireless phone.

According to an aspect, one or more application programs 850 are loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. According to an aspect, the intuitive document navigation system 116 is loaded into memory 862. The system 802 also includes a non-volatile storage area 868 within the memory 862. The non-volatile storage area 868 is used to store persistent information that should not be lost if the system 802 is powered down. The application programs 850 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800.

According to an aspect, the system 802 has a power supply 870, which is implemented as one or more batteries. According to an aspect, the power supply 870 further includes an external power source, such as an AC adapter or a powered docking cradle that supplements or recharges the batteries.

According to an aspect, the system 802 includes a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 850 via the operating system 864, and vice versa.

According to an aspect, the visual indicator 820 is used to provide visual notifications and/or an audio interface 874 is used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. According to an aspect, the system 802 further includes a video interface 876 that enables an operation of an on-board camera 830 to record still images, video stream, and the like.

According to an aspect, a mobile computing device 800 implementing the system 802 has additional features or functionality. For example, the mobile computing device 800 includes additional data storage devices (removable and/or non-removable) such as, magnetic disks, optical disks, or tape. Such additional storage is illustrated in FIG. 8B by the non-volatile storage area 868.

According to an aspect, data/information generated or captured by the mobile computing device 800 and stored via the system 802 is stored locally on the mobile computing device 800, as described above. According to another aspect, the data is stored on any number of storage media that is accessible by the device via the radio 872 or via a wired connection between the mobile computing device 800 and a separate computing device associated with the mobile computing device 800, for example, a server computer in a distributed computing network, such as the Internet. As should be appreciated such data/information is accessible via the mobile computing device 800 via the radio 872 or via a distributed computing network. Similarly, according to an aspect, such data/information is readily transferred between computing devices for storage and use according to well-known data/information transfer and storage means, including electronic mail and collaborative data/information sharing systems.

FIG. 9 illustrates one example of the architecture of a system for providing intuitive document navigation for improved computer efficiency as described above. Content developed, interacted with, or edited in association with the intuitive document navigation system 116 is enabled to be stored in different communication channels or other storage types. For example, various documents may be stored using a directory service 922, a web portal 924, a mailbox service 926, an instant messaging store 928, or a social networking site 930. The intuitive document navigation system 116 is operative to use any of these types of systems or the like for providing intuitive document navigation for improved computer efficiency, as described herein. According to an aspect, a server 920 provides the intuitive document navigation system 116 to clients 905a,b,c. As one example, the server 920 is a web server providing the intuitive document navigation system 116 over the web. The server 920 provides the intuitive document navigation system 116 over the web to clients 905 through a network 910. By way of example, the client computing device is implemented and embodied in a personal computer 905a, a tablet computing device 905b or a mobile computing device 905c (e.g., a smart phone), or other computing device. Any of these examples of the client computing device are operable to obtain content from the store 916.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A device comprising one or more processors, the one or more processors being configured to:
   cause at least a portion of a document to be displayed in a graphical user interface, the at least a portion of the document including an interactive content element having one or more interaction controls;
   receive a first input by a user to navigate past the interactive content element;
   upon displaying the interactive content element and in response to the first input, apply a customized transparent overlay to the interactive content element, wherein the customized transparent overlay is customized to the interactive content element and the one or more interaction controls of the interactive content element such that the one or more interaction controls of the interactive content element are persistently exposed on or above the customized transparent overlay, the customized transparent overlay preventing user interaction with at least a portion of the interactive content element while allowing user interaction with the one or more interaction controls of the interactive content element;
   receive a first message associated with a second input by the user on the customized transparent overlay;
   in response to the first message, navigate past the interactive content without triggering an interaction with the interactive content while continuing to display the customized transparent overlay;
   while displaying the customized transparent overlay, receive a second message associated with a third input by the user on one of the one or more interaction controls of the interactive content element;
   in response to the second message,
   remove the customized transparent overlay from the interactive content element; and
   enable user interaction with the interactive content element.

2. The device of claim 1, further comprising: determining to remove the customized transparent overlay from the interactive content element when the received second message indicates that a user-controlled cursor is over the interactive content element, and the third input is one of:
   a selection;
   a touch event; or
   a hover.

3. The device of claim 1, further comprising: determining to remove the customized transparent overlay from the interactive content element when the received second message indicates that a user input is not received within a predetermined timespan.

4. The device of claim 1, further comprising: determining to persist the customized transparent overlay on the interactive content element when the received first message indicates that a user input is associated with a scrolling or panning operation.

5. The device of claim 1, wherein the one or more processors are operative to:
   receive a third message associated with a fourth user input event;
   make a determination as to whether to reapply the customized transparent overlay to the interactive content element based at least in part on the received third message; and
   in response to a positive determination:
      reapply the customized transparent overlay to the interactive content element.

6. The device of claim 1, wherein in response to removing the customized transparent overlay from the interactive content element, a visual indicator is displayed in the graphical user interface for informing a user how to navigate the document.

7. A computer-implemented method for navigating a document, comprising:
   displaying at least a portion of the document in a graphical user interface, the at least a portion of the document including an interactive content element having one or more interaction controls;
   receiving a first input by a user to navigate past the interactive content element;
   based on the first input by the user to navigate past the interactive content element, applying a customized transparent overlay to the interactive content element, wherein the customized transparent overlay is customized to the interactive content element and the one or more interaction controls of the interactive content element such that the one or more interaction controls of the interactive content element are persistently exposed on or above the customized transparent overlay, and the customized transparent overlay prevents user interaction with at least a portion of the interactive content element while allowing user interaction with the one or more interaction controls of the interactive content element;
   receiving a first message associated with a second input by the user on the customized transparent overlay;
   in response to the first message, navigating past the interactive content without triggering an interaction with the interactive content while continuing to display the customized transparent overlay;
   while displaying the customized transparent overlay, receiving a second message associated with a third input by the user on one of the one or more interaction controls of the interactive content element;
   in response to the second message,
   removing the customized transparent overlay from the interactive content element; and
   enabling user interaction with the interactive content element.

8. The computer-implemented method of claim 7, wherein making a determination as to whether to remove the customized transparent overlay from the interactive content element based at least in part on the received second message comprises making a determination to remove the customized transparent overlay from the interactive content element when the received second message indicates that a user-controlled cursor is over the interactive content element, and the third input is one of:
   a selection;
   a touch event; or a hover.

9. The computer-implemented method of claim 7, wherein making a determination as to whether to remove the overlay from the interactive content element based at least in part on the received second message comprises making a determination to remove the overlay from the interactive content element when the received second message indicates that a user input is not received within a predetermined timespan.

10. The computer-implemented method of claim 7, wherein determining that an intent of the user is to navigate past the interactive content element includes receiving a user input associated with a scrolling or panning operation.

11. The computer-implemented method of claim 7, wherein applying the overlay to the interactive content element comprises applying a customized overlay to the interactive content element, wherein the customized overlay exposes one or more user interaction controls associated with the interactive content element for enabling user interaction with the one or more user interaction controls.

12. The computer-implemented method of claim 7, further comprising:
receiving a third message associated with a second user input event;
making a determination as to whether to reapply the overlay to the interactive content element based at least in part on the received third message; and
in response to a positive determination:
reapplying the overlay to the interactive content element.

13. The computer-implemented method of claim 7, wherein in response to removing the overlay from the interactive content element, displaying a visual indicator for informing a user how to navigate the document.

14. A computer-readable storage media including instructions, which when executed by a computer, provides:
an application;
an application programming interface for enabling the application to communicate with an intuitive document navigation system; and
the intuitive document navigation system, wherein the intuitive document navigation system is operative to:
upon displaying an interactive content element embedded in a document and in response to receipt of a first input by a user to navigate past the interactive content element, apply a customized transparent overlay to the interactive content element embedded in the document, wherein the customized transparent overlay is customized to the interactive content element and one or more interaction controls of the interactive content element such that the one or more interaction controls of the interactive content element are persistently exposed on or above the customized transparent overlay, and the customized transparent overlay prevents user interaction with at least a portion of the interactive content element while allowing user interaction with the one or more interaction controls of the interactive content element:
receive a first message associated with a second input by the user on the customized transparent overlay;
in response to a determination that the second input is on one of the one or more interaction controls of the interactive content element:
remove the customized transparent overlay from the interactive content element; and
enable user interaction with the interactive content element; and
in response to a negative determination that the second input is one to navigate past the interactive content without triggering a scrolling or a panning operation with the interactive content, persist the customized transparent overlay on the interactive content element.

15. The computer-readable storage media of claim 14, wherein in making a determination as to whether to remove the overlay from the interactive content element based at least in part on the received first message, the intuitive document navigation system is operative to make a determination to remove the overlay from the interactive content element when:
the received first message indicates that a user input is not received within a predetermined timespan; or
the received first message indicates that a user-controlled cursor is over the interactive content element, and the second input is one of:
a selection;
a touch event; or
a hover.

16. The computer-readable storage media of claim 14, wherein in applying the overlay to the interactive content element, the intuitive document navigation system is operative to apply a customized overlay to the interactive content element, wherein the customized overlay exposes one or more user interaction controls associated with the interactive content element for enabling user interaction with the one or more user interaction controls.

17. The computer-readable storage media of claim 14, wherein the intuitive document navigation system is further operative to:
receive a second message associated with a third user input event;
make a determination as to whether to reapply the overlay to the interactive content element based at least in part on the received third message; and
in response to a positive determination:
reapply the overlay to the interactive content element.

18. The computer-readable storage media of claim 14, wherein in response to removing the overlay from the interactive content element, the intuitive document navigation system is further operative to display a visual indicator for informing a user how to navigate the document.

\* \* \* \* \*